(12) United States Patent
Jang et al.

(10) Patent No.: US 6,246,599 B1
(45) Date of Patent: Jun. 12, 2001

(54) CONSTANT FREQUENCY RESONANT INVERTERS WITH A PAIR OF RESONANT INDUCTORS

(75) Inventors: Yungtaek Jang, Apex; Milan M. Jovanovic, Cary, both of NC (US)

(73) Assignee: Delta Electronics, Inc. (TW)

( * ) Notice: Subject to any disclaimer, the term of this patent is extended or adjusted under 35 U.S.C. 154(b) by 0 days.

(21) Appl. No.: 09/645,342

(22) Filed: Aug. 25, 2000

(51) Int. Cl.[7] .................. H02M 7/5387; H02M 7/68; H02M 3/24
(52) U.S. Cl. ................. 363/132; 363/17; 363/98
(58) Field of Search ................. 363/17, 132, 98, 363/131, 56

(56) References Cited

U.S. PATENT DOCUMENTS

| | | | |
|---|---|---|---|
| 4,672,528 | * 6/1987 | Park et al. | 363/98 |
| 4,814,962 | * 3/1989 | Magalhaes et al. | 363/16 |
| 4,825,348 | * 4/1989 | Steigerwald et al. | 363/17 |
| 4,864,479 | 9/1989 | Steigerwald | 363/17 |
| 4,876,635 | * 10/1989 | Park et al. | 363/17 |
| 4,992,919 | * 2/1991 | Lee et al. | 363/17 |
| 5,157,593 | * 10/1992 | Jain | 363/17 |
| 5,208,738 | * 5/1993 | Jain | 363/17 |
| 5,594,632 | * 1/1997 | Barrett | 363/44 |
| 6,072,856 | * 6/2000 | Van Der Broeck et al. | 363/132 |

OTHER PUBLICATIONS

M. K. Kazimierczuk et al, "Resonant Power Converters," John Wiley & Sons Inc., New York, 1995 (Ch. 12, pp. 331–345). No Month.

J. Sabate et al., "Analysis and Design Optimization of LCC Resonant Inverter for High–Frequency AC Distributed Power System," IEEE Trans. Industrial Electronics, vol. 42, No. 1, pp. 63–71, Feb. 1995.

D. Czarkowski et al., "Phase–Controlled Series–Parallel Resonant Converter," IEEE Trans. Power Electronics, vol. 8, No. 3, pp. 309–319, Jul. 1993.

* cited by examiner

*Primary Examiner*—Peter S. Wong
*Assistant Examiner*—Bao Q. Vu
(74) *Attorney, Agent, or Firm*—Venable; Laurence J. Marhoefer

(57) ABSTRACT

A constant frequency, DC/AC inverters that employs a coupled inductor to achieve ZVS in a wide range of load current and input voltage with a reduced circulating energy. In the circuits of the invention, the two windings of the coupled inductors are connected in series and their common terminal is connected to one end of the primary winding of the isolation transformer, which has the other end of the primary winding connected to ground. Each of the other two terminals of the coupled inductors is coupled to the midpoint of the corresponding bridge leg through a series connection of the resonant inductor and a resonant or blocking capacitor. For non-isolated inverter implementations, the common terminal of the coupled inductor is connected directly to the load. The output voltage regulation in the inverters is achieved by a constant-frequency phase shifted control.

26 Claims, 15 Drawing Sheets

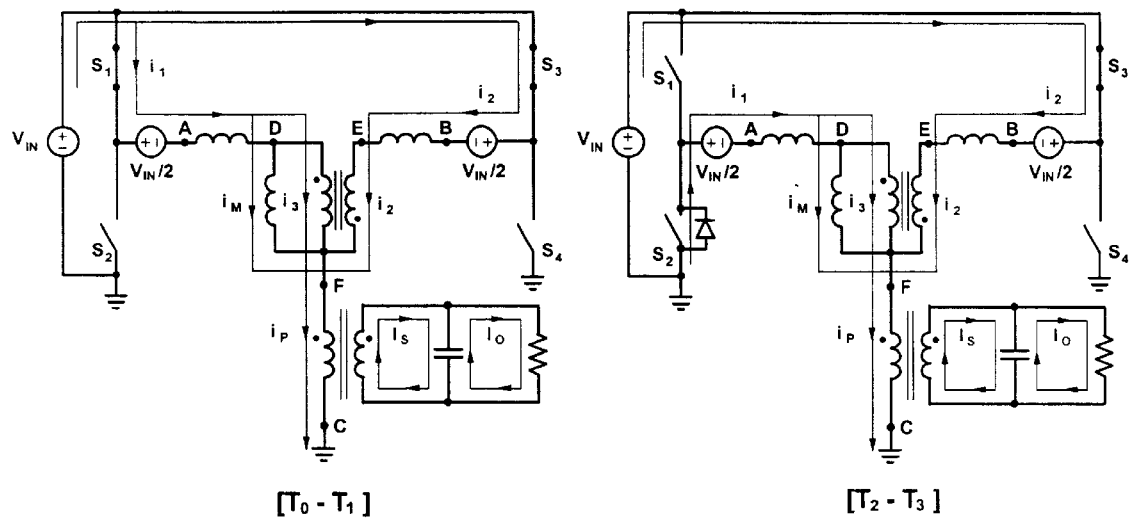
[T₀ - T₁]
Fig. 5(a)
[T₂ - T₃]
Fig. 5(c)
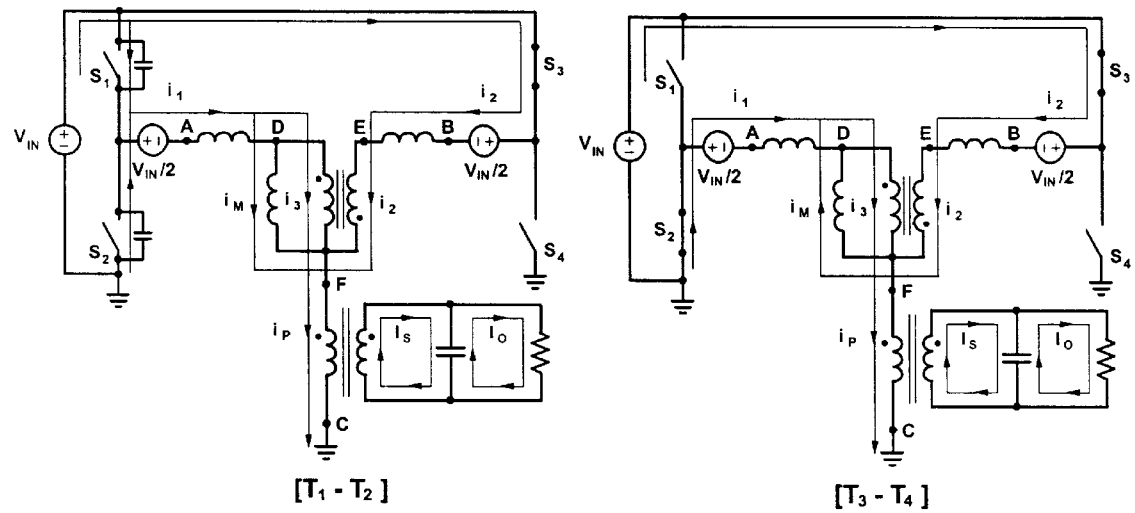
[T₁ - T₂]
Fig. 5(b)
[T₃ - T₄]
Fig. 5(d)

[T₄ - T₅]

[T₆ - T₇]

[T₅ - T₆]

[T₇ - T₈]

[T₈ - T₉]

[T₁₀ - T₁₁]

[T₉ - T₁₀]

[T₁₁ - T₁₂]

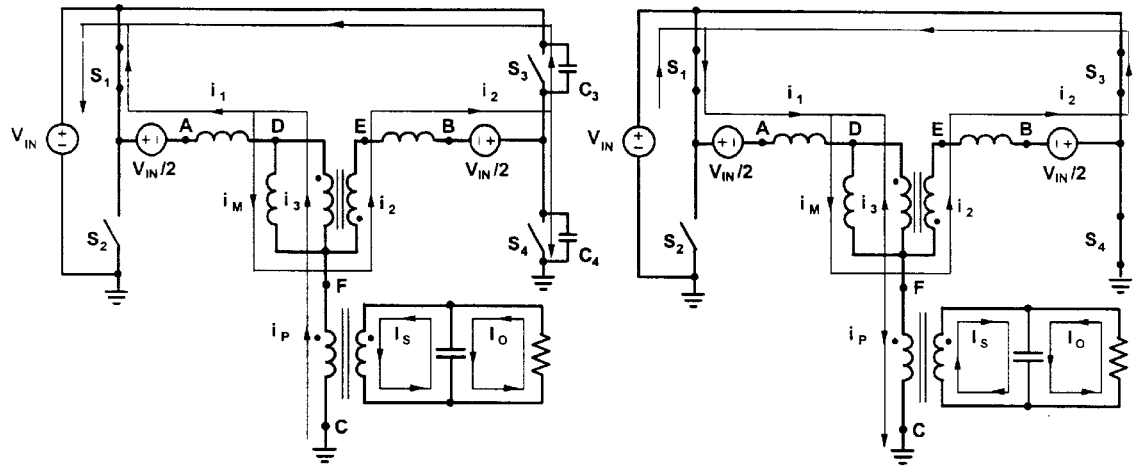
[T₁₂ - T₁₃]
Fig. 5(m)
[T₁₄ - T₁₅]
Fig. 5(o)
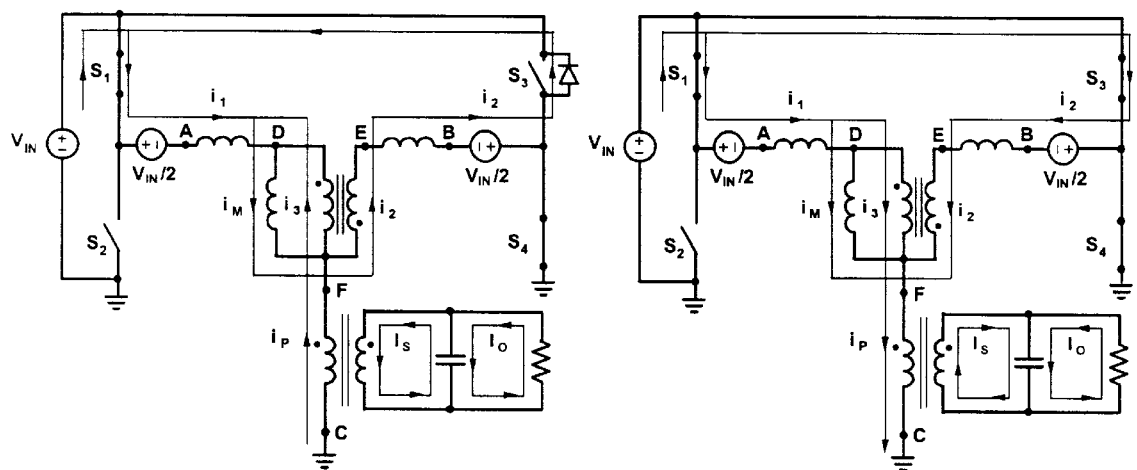
[T₁₃ - T₁₄]
Fig. 5(n)
[T₁₅ - T₁₆]
Fig. 5(p)

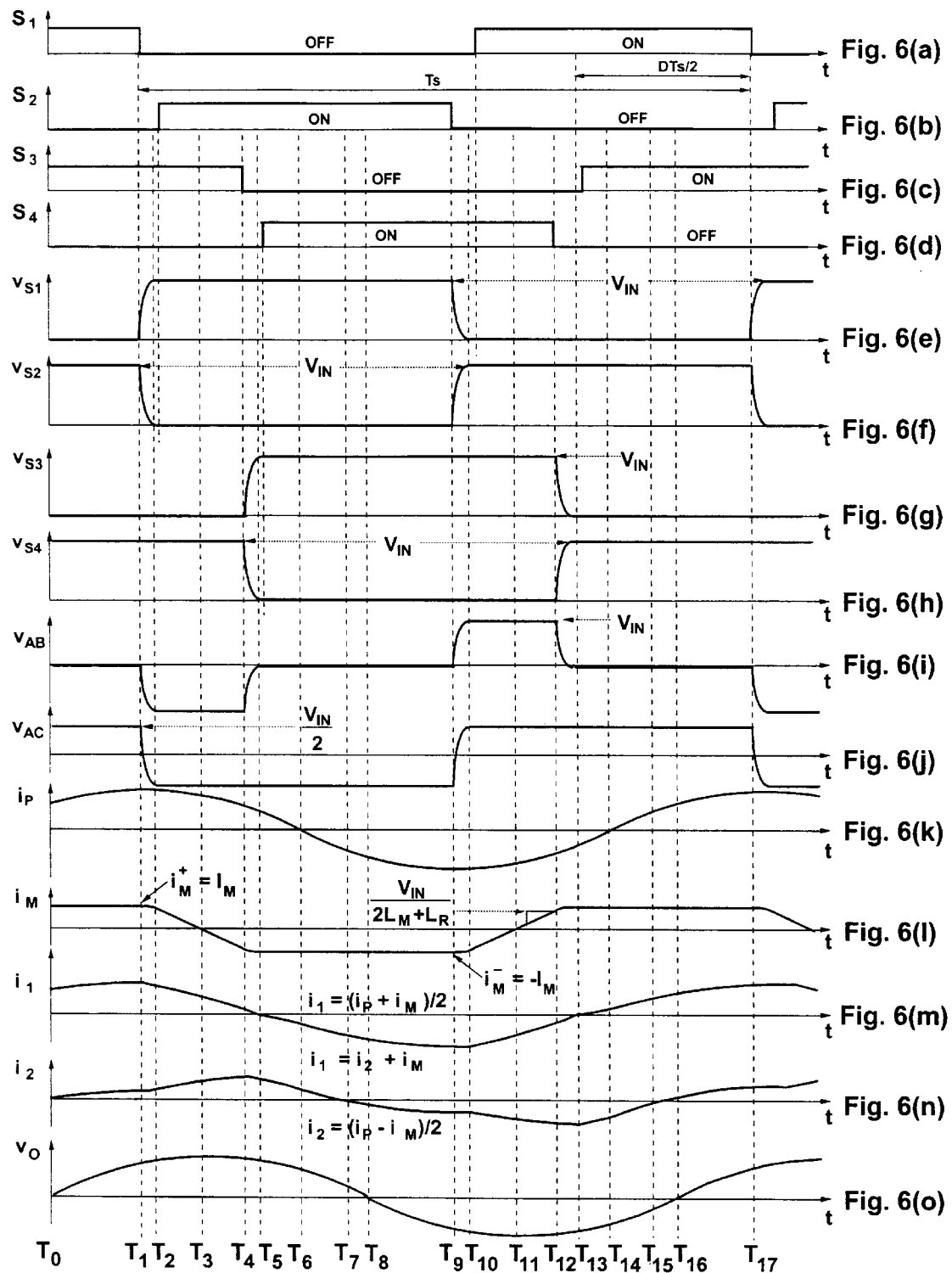

CONSTANT FREQUENCY RESONANT INVERTERS WITH A PAIR OF RESONANT INDUCTORS

BACKGROUND OF THE INVENTION

1. Field of the Invention

This invention relates to dc/ac inverters, and more particularly, to the constant-frequency, sinusoidal dc/ac inverters that utilize a coupled inductor to achieve zero-voltage switching of the switches in a wide range of input-voltage and load-current conditions.

2. Description of the Prior Art

Generally, high-frequency inverters employ a resonant or a soft-switching technique to reduce switching losses and, consequently, improve the conversion efficiency. However, the majority of these resonant- and soft-switched-type inverters require variable-frequency control to maintain a regulation of the output. While in many applications variable-frequency control exhibits an acceptable performance, a number of applications require a constant-frequency control. One of the most notable application that requires a constant-frequency inverter is the ac-distribution power system. In such a system, a constant-frequency sinusoidal or trapezoidal ac voltage is distributed to the loads for a final point-of-load conversion by load converters.

Constant-frequency control of inverters is implemented by the phase control, which is also called the "outphasing modulation." In this type of control, the output regulation is achieved at a constant frequency by phase shifting the switching instances of the corresponding switches in the two legs of the inverter. With no phase shift, the output delivers full power, whereas for a phase shift of 180°, the output power is reduced to zero. An extensive analysis of the series-resonant inverter (SRI) with phase control is presented in [1]. The same analysis can be extended to any other inverter topology such as, for example, the parallel-resonant inverter (PRI), or the series-parallel resonant inverter (SPRI). Generally, the PRI and SPRI topologies are employed in applications which require no load operation since the SRI topology cannot regulate the output at no load because without a load the series resonant tank circuit is open.

As an example of prior art, FIG. 1 shows the circuit diagram of an isolated full-bridge PRI along with the timing of its control signals [2]. The parallel resonant circuit in FIG. 1 is implemented with primary-side resonant inductor $L_R$ and secondary-side resonant capacitor $C_R$. However, it should be noted that the resonant capacitor could also be placed across the primary winding. Regardless of the placement of the resonant capacitor, the circuit in FIG. 1 offers a sinusoidal output voltage with a relatively low harmonic distortion, as well as the output voltage regulation in the entire load range from the full load down to no load. When the switching frequency of the circuit in FIG. 1 is below the resonant frequency, the primary switches turn off at zero current, whereas above the resonant frequency the primary switches turn on at zero voltage. The major deficiency of the PRI is a relatively low partial-load efficiency due to a significant circulating energy in the resonant tank, which is required to maintain soft-switching at lighter loads. As a result, the PRI is not suitable for applications that require low power loss at light loads as, for example, power supplies for personal computers.

The light-load performance of the PRI can be improved by employing the SPRI topology shown in FIG. 2. In the symmetrical SPRI circuit in FIG. 2, which consists of two bridge legs and multiple resonant components, inductors $L_{R1}$ and $L_{R2}$ form series resonant circuits with corresponding series capacitors $C_{S1}$ and $C_{S2}$ and parallel resonant circuits with capacitor $C_P$. Because a properly designed SPRI circuit behaves like a PRI circuit at light loads and like a SRI circuit at higher loads, the SPRI can regulate the output down to no load with an improved partial-load efficiency. Nevertheless, although the circulating energy in the SPRI is reduced compared to that of the PRI, the SPRI still circulates an unnecessarily high energy to maintain soft switching in the entire load and input-voltage range. Moreover, because the Q-factor of a properly designed SPRI that minimizes the circulating energy is usually lower than the corresponding Q-factor of the PRI, the output voltage of the SPRI typically exhibits higher harmonic distortions than the output voltage of the PRI.

SUMMARY OF THE INVENTION

In the present invention, new constant-frequency, dc/ac inverters that employ a coupled inductor to achieve ZVS in a wide range of load current and input voltage with a reduced circulating energy are described. In the circuits of this invention, the two windings of the coupled inductor are connected in series and their common terminal is connected to one end of the primary winding of the isolation transformer, which has the other end of the primary winding connected to the ground. The each of the other two terminals of the coupled inductor is connected to the midpoint of the corresponding bridge leg through a series connection of a resonant inductor and a resonant or blocking capacitor. For non-isolated inverter implementations, the common terminal of the coupled inductor is connected directly to the load. The output voltage regulation in the inverters is achieved by a constant-frequency phase-shift control.

The circuits of the present invention utilizes the sum of the energy stored in the resonant inductor and the magnetizing inductance of the coupled inductor to discharge the capacitance across the switch that is about to be turned on and, consequently, achieve ZVS. Moreover, since the coupled inductor can transfer current (energy) from the winding in one bridge leg to the other bridge leg, the circuits have a unique characteristic that all switches are turned off when they carry a current of the same magnitude. As a result, the energy available for the discharge of the capacitance of the switch is the same for all switches. In addition, the circuits of the present invention can achieve ZVS of the switches even at no load by properly selecting the value of the magnetizing inductance of the coupled inductor. Because in the circuits of the present invention the energy required for ZVS is mainly provided by the energy stored in the magnetizing inductance of the coupled inductor, the circulating energy of the resonant tank circuit can be minimized, which significantly improves partial-load efficiency.

BRIEF DESCRIPTION OF THE DRAWINGS

FIGS. 6(a)–(o) shows key waveforms of PRI of present invention: (a) driving signal of switch $S_1$; (b) driving signal of switch $S_2$; (c) driving signal of switch $S_3$; (d) driving signal of switch $S_4$; (e) voltage waveform $v_{S1}$ across switch S1; (f) voltage waveform $v_{S2}$ across switch $S_2$; (g) voltage waveform $V_{S3}$ across switch S3; (h) voltage waveform $v_{S4}$ across switch $S_4$; (i) voltage waveform $v_{AB}$; (j) voltage waveform $v_{AC}$; (k) primary current waveform $i_P$; (l) magnetizing current waveform $i_M$; (m) waveform of current $i_1$; (n) waveform of current $i_2$; (o) voltage waveform at input of output filter $v_S$.

DETAILED DESCRIPTION OF THE INVENTION

Figure 1A:
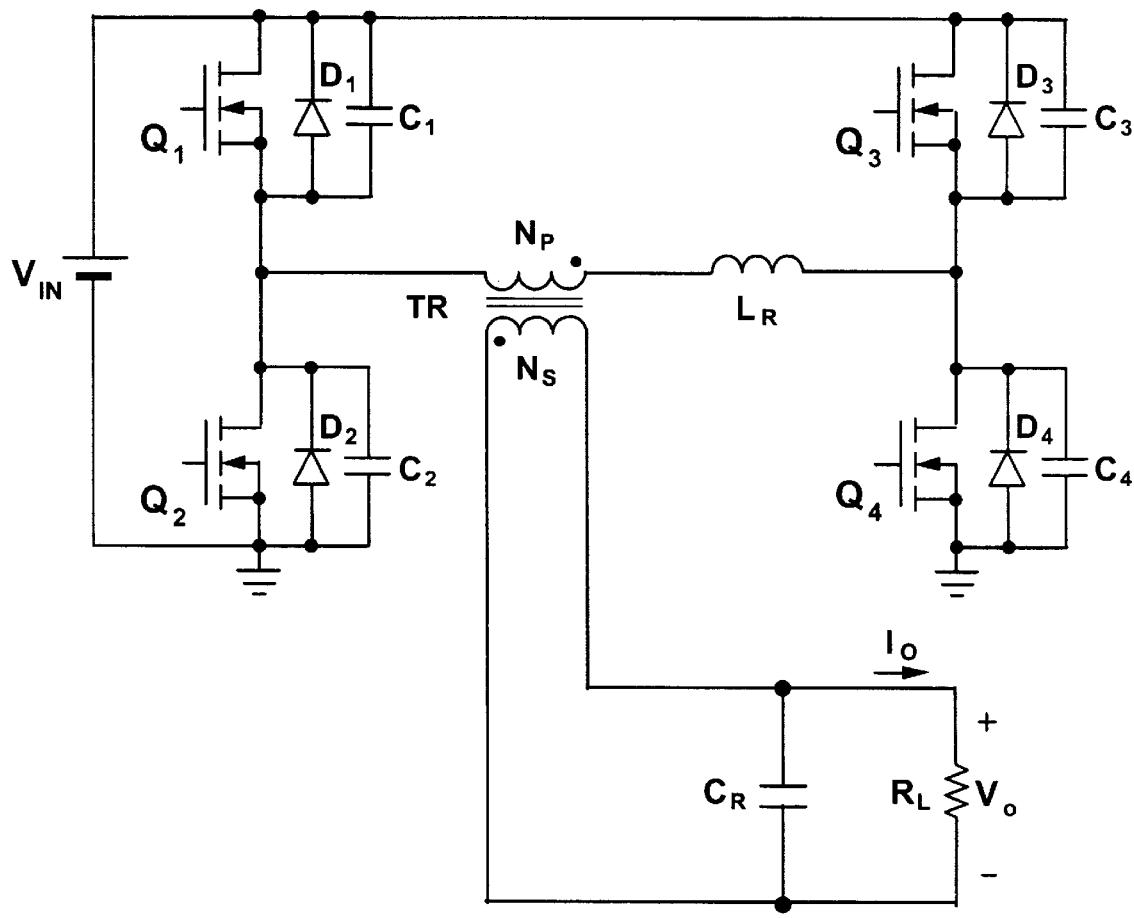
FIG. 1 shows constant-frequency full-bridge parallel-resonant inverter (PRI) [2]: (a) circuit diagram of power stage; (b) gate-drive timing diagram. (prior art)
Figure 1B:
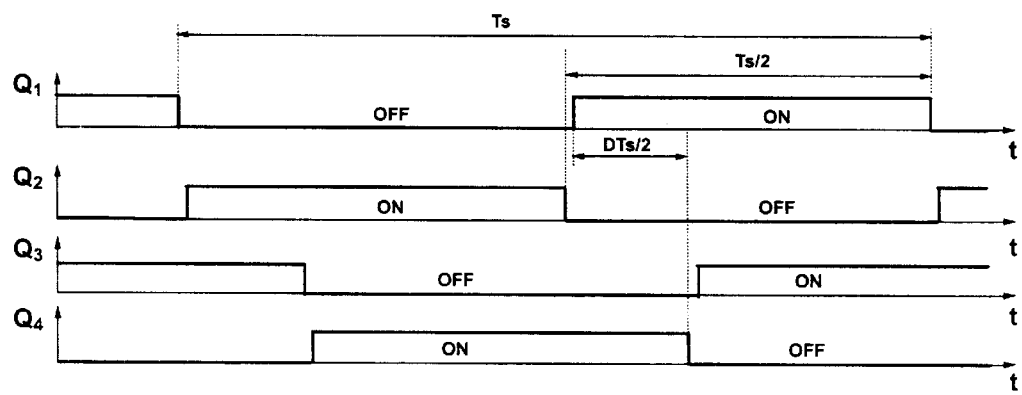
Figure 2A:
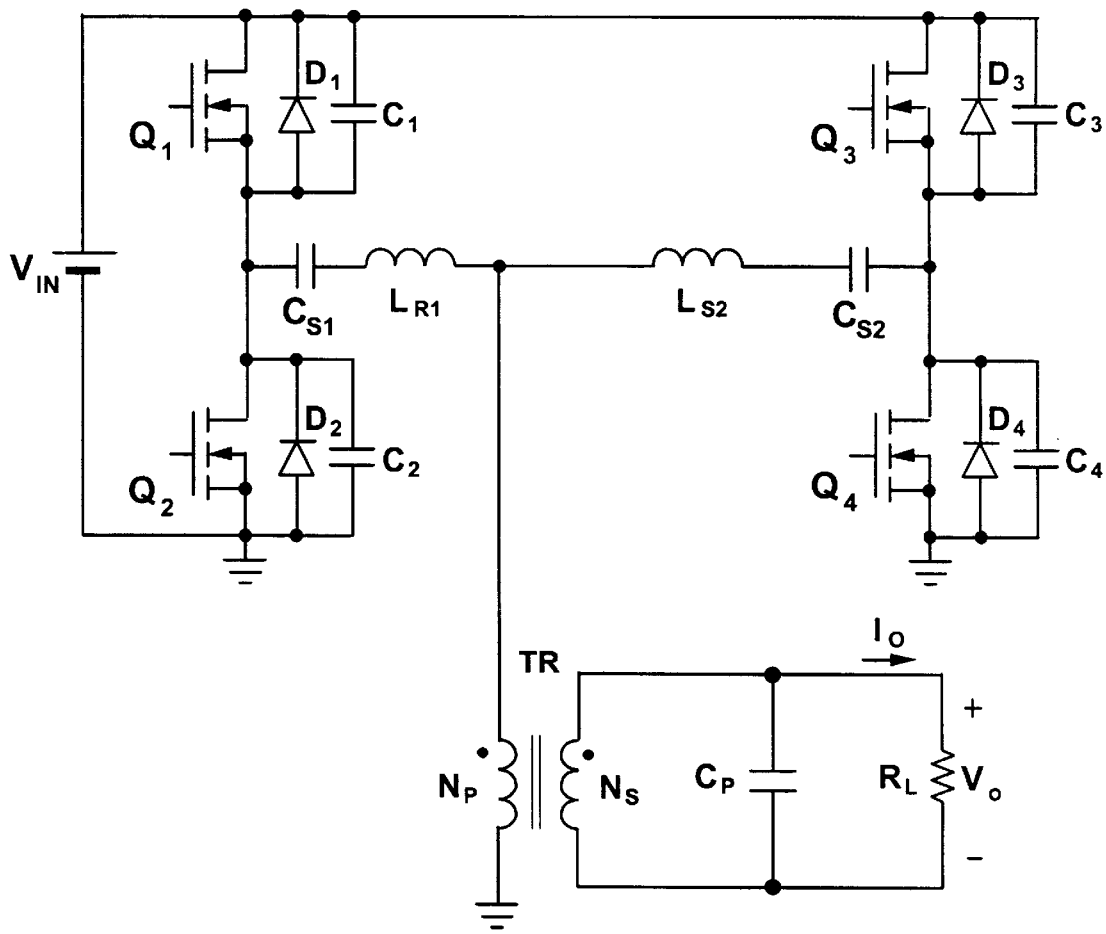
FIG. 2 shows series-parallel resonant inverter (SPRI) implemented with multiple resonant components [3]: a) circuit diagram of power stage; (b) gate-drive timing diagram. (prior art)
Figure 2B:
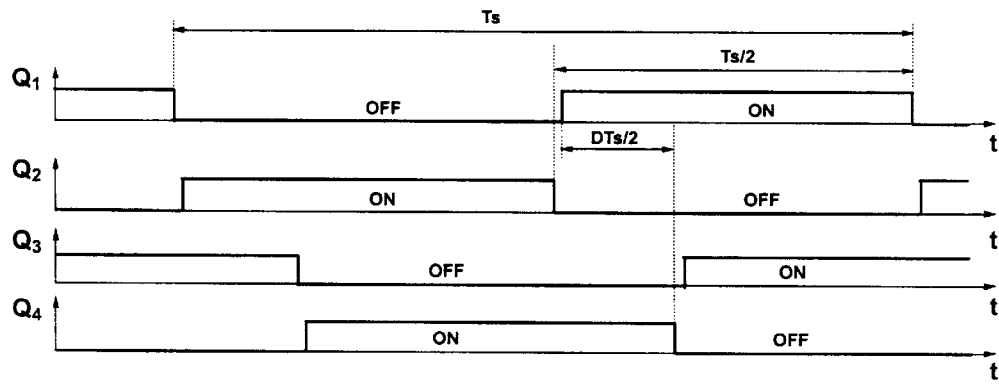
Figure 3:
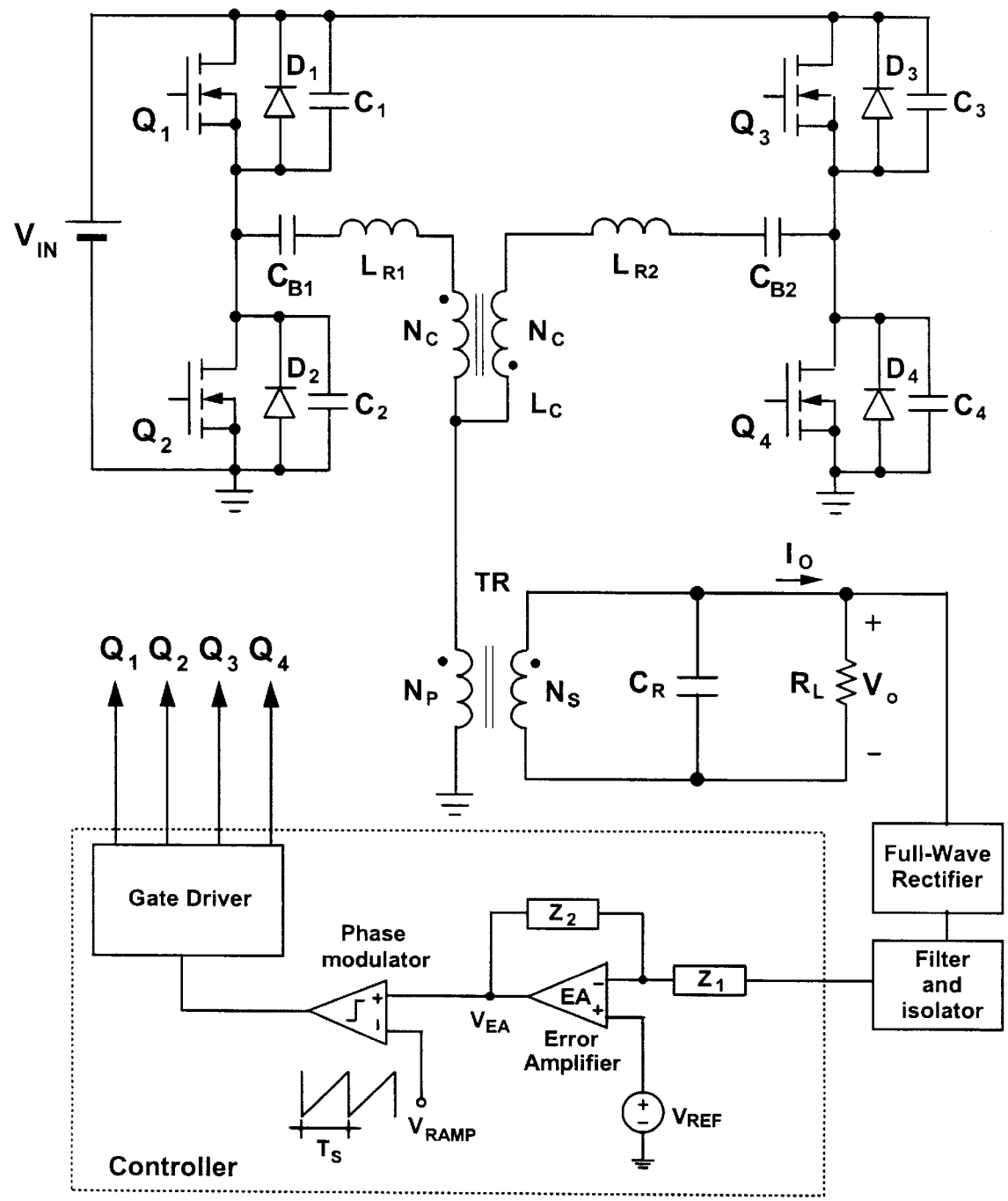
FIG. 3 shows PRI that uses coupled inductor to extend zero-voltage-switching range with minimum circulating current in accordance with present invention.

One embodiment of the present invention that employs a coupled inductor on the primary side to extend the ZVS range of the switches with a minimum circulating energy and conduction loss is shown in FIG. 3. The circuit in FIG. 3 is an isolated PRI, which utilizes the parallel resonant-tank circuit consisting of primary side resonant inductors $L_{R1}$ and $L_{R2}$ and secondary-side resonant capacitor $C_R$ to generate a sinusoidal voltage at the output. One terminal of each of the two resonant inductors is connected to the corresponding inverter leg through a capacitor. The other terminal of each resonant inductor is connected in series with a corresponding winding of coupled inductor $L_C$, whose common terminal is connected to transformer TR. The two primary capacitors, $C_{B1}$ and $C_{B2}$ are used to prevent the saturation of the coupled inductor and transformer cores by blocking the flow of a dc current through $L_C$ and TR. Generally, in the PRI these capacitors are selected large enough so that their voltages are approximately constant during a switching cycle. In other implementations, these capacitors can be used as a part of a resonant tank circuit. To regulate the output voltage against load and/or input voltage changes at a constant switching frequency, the circuit in FIG. 3 requires a phase-shift control. Although in this description of the present invention an isolated PRI is used, it should be noted that the same concept could be extended to any isolated or non-isolated resonant converter.

Figure 4:
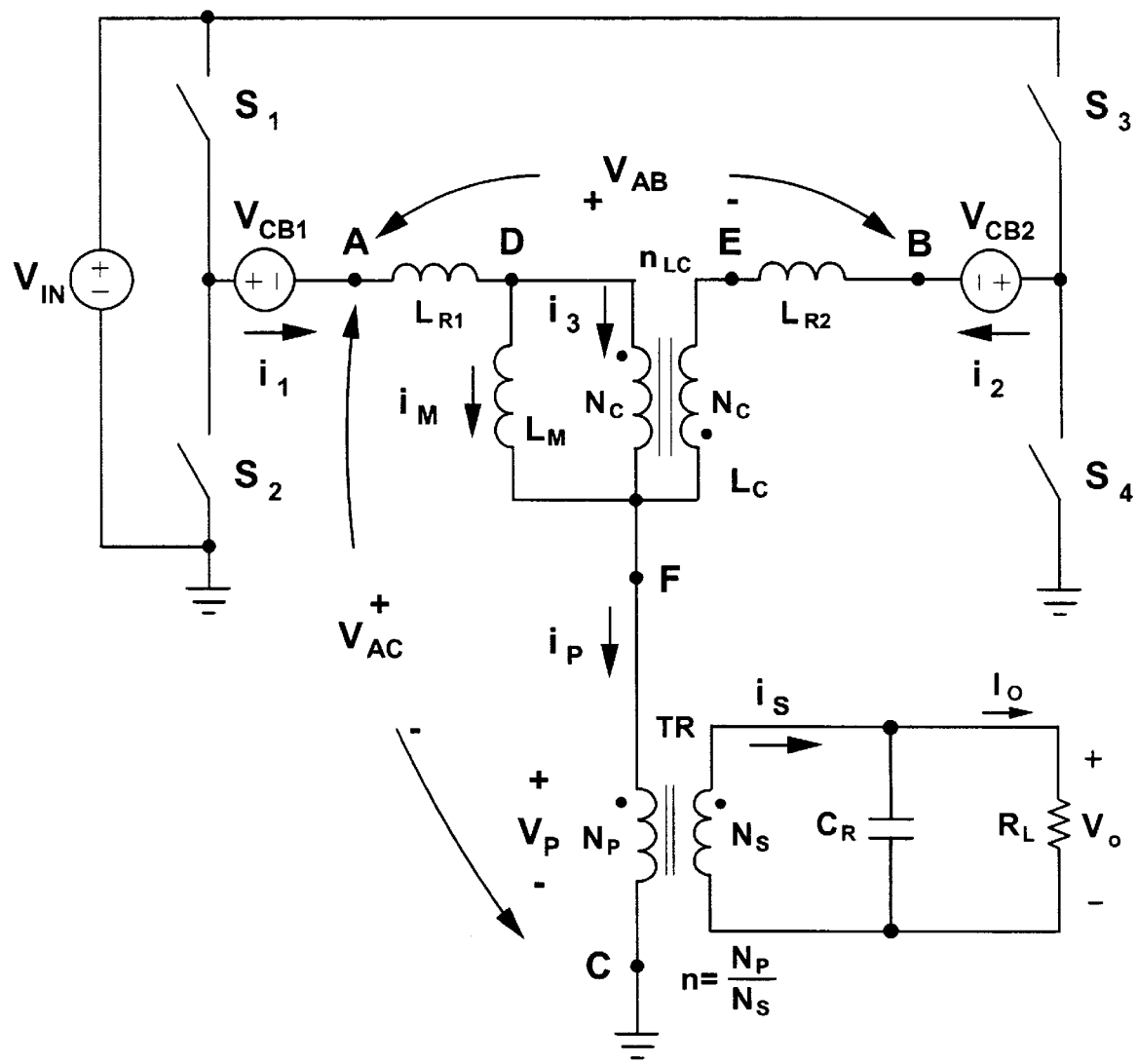
FIG. 4 is simplified circuit model of PRI of present invention that shows reference directions of currents and voltages.

To facilitate the explanation of operation of the circuit in FIG. 3, FIG. 4 shows its simplified circuit diagram. In the simplified circuit, it is assumed that the capacitance of blocking capacitors $C_{B1}$ and $C_{B2}$ is large enough so that the capacitors can be modeled as constant voltage sources. Because the average voltages of the coupled inductor windings and the transformer windings during a switching cycle are zero and because when a phase-shift control is used the pair of switches in each bridge leg operates with 50% duty cycle, the magnitude of voltage sources $V_{CB1}$ and $V_{CB2}$ in FIG. 4 is equal to $V_{IN}/2$, i.e., $V_{CB1}=V_{CB2}=V_{IN}/2$.

To further simplify the analysis, it is also assumed that the resistance of conducting semiconductor switches is zero, whereas the resistance of the non-conducting switches is infinite. In addition, small leakage inductances of the coupled inductor and transformer, as well as a large magnetizing inductance of the transformer are neglected because their effect on the operation of the converter is negligible. Magnetizing inductance of coupled inductor $L_C$ and output capacitances of primary switches $C_1$–$C_4$ are not neglected in this analysis since they play a major roll in the operation of the circuit. In FIG. 4, coupled inductor $L_C$ is modeled as an ideal transformer with a turns ratio $n_{LC}=1$ and with parallel magnetizing inductance $L_M$ to winding DE. The number of turns of each of the windings of $L_C$ is $N_C$.

Finally, to further facilitate the analysis, FIG. 5 shows the topological stages of the converter during a switching cycle, whereas FIG. 6 shows the key waveforms.

As can be seen from FIG. 4, because the turns ratio of the windings of $L_C$ is unity ($n_{LC}=1$), current $i_3$ flowing through winding EF is always equal to current $i_2$ flowing through winding DE, i.e. $i_3=i_2$. As a result, $$i_1=i_3+i_M=i_2+i_M, \quad (1)$$

and since $$i_P=i_1+i_2 \quad (2)$$

the relationship between currents $i_1$, $i_2$, $i_M$, and $i_P$ can be expressed as $$i_1=\tfrac{1}{2}(i_P+i_M) \quad (3)$$

and $$i_2=\tfrac{1}{2}(i_P-i_M). \quad (4)$$

As shown in FIG. 6, during the time interval $T_O$–$T_1$, switch $S_1$ in leg $S_1$–$S_2$ and switch $S_3$ in leg $S_3$–$S_4$ are closed and currents $i_1$ and $i_2$ flow through the corresponding switch, blocking capacitor, resonant inductor, and winding of the coupled inductor into the primary of the transformer, as can be seen from the equivalent circuit in FIG. 5(a). From FIG. 5(a) can also be seen that during this topological stage voltage $V_{AB}$ must be zero since voltage sources $V_{CB1}=V_{IN}/2$ and $V_{CB2}=V_{IN}/2$ are connected in opposition through closed switches $S_1$ and $S_3$. Furthermore, because of the coupled inductor $L_C$ winding orientation (dot positions in FIG. 5(a)), $$V_{AB} = V_{AD} + V_{DF} + V_{FE} + V_{EB} \quad (5)$$

$$= L_{R1}\frac{di_1}{dt} + V_{DF} + V_{FE} - L_{R2}\frac{di_2}{dt} = 0$$

can only be maintained if the voltages across the couple inductor windings are zero. Namely, for a relatively large magnetizing inductance $L_M$, magnetizing current $i_M$ is virtually constant during the $T_0$–$T_1$ interval so that $di_1/dt=di_2/dt$ and, therefore, for $L_{R1}=L_{R2}$, $V_{AD}=V_{EB}$. As a result, relationship $V_{AB}=V_{AD}+V_{DF}+V_{FE}+V_{EB}=V_{DF}+V_{FE}=0$ can only be fulfilled if $V_{DF}=V_{FE}=0$ since both $V_{DF}$ and $V_{FE}$ are positive (i.e., have same polarity). As shown in FIG. 6(j), in this topological stage $V_{AC}=V_{BC}=V_{IN}-V_{IN}/2=V_{IN}/2$.

When at $t=T_1$ switch $S_1$ is turned off, current $i_1$ is diverted from the transistor of switch $S_1$ to its output capacitance $C_1$, as shown in FIG. 5(b). In this topological stage, current $i_1$ charges capacitor $C_1$ and discharges capacitor $C_2$ at the same rate since the sum of the capacitor voltages is equal to constant voltage $V_{IN}$, as illustrated in FIGS. 6(e) and (f). As a result, the potential of point A starts decreasing causing a decrease of voltages $V_{AB}$ and $V_{AC}$. Namely, $V_{AB}$ decreases from zero toward negative $V_{IN}$, whereas $V_{AC}$ decreases from $V_{IN}/2$ toward negative $V_{IN}/2$, as illustrated in FIGS. 6(i) and (j). After capacitor $C_2$ is fully discharge, i.e., when voltage $V_{S2}$ reaches zero, current $i_1$ starts flowing through antiparallel diode $D_2$ of switch $S_2$, as shown in FIG. 5(c). Due to negative voltage $V_{IN}/2$ applied across the series connection resonant inductor $L_{R1}$ and magnetizing inductance $L_M$ of coupled inductor $L_C$, magnetizing current $i_M$ decreases with a rate of approximately $(V_{IN}/2)/(L_M+L_{R1})$. At the same time, primary current $i_P$ decreases in a resonant fashion. As a result, current $i_1=(i_P+i_M)/2$ decreases, whereas current $i_2=(i_P-i_M)/2$ increases. To achieve zero-voltage turn-on of $S_2$, it is necessary to turn-on $S_2$ while its antiparallel diode $D_2$ is conducting. In FIG. 6, $S_2$ is turned on immediately after $v_{S2}$ has fallen to zero.

Figure 5E:
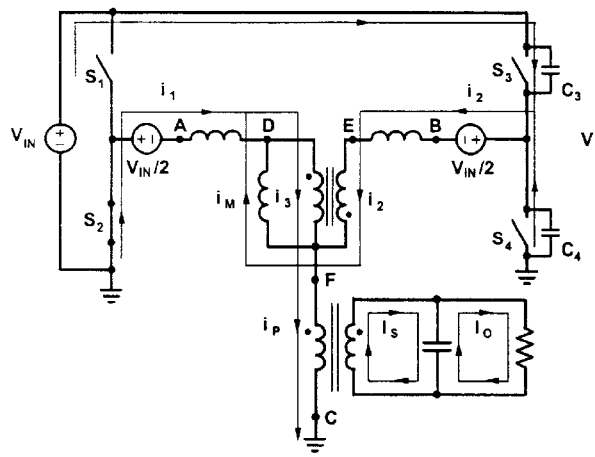
FIGS. 5(a)–(p) shows topological stage of PRI of present invention during switching cycle.
Figure 5G:
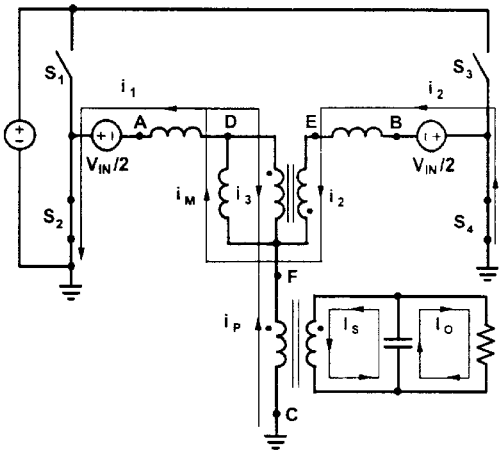
Figure 5F:
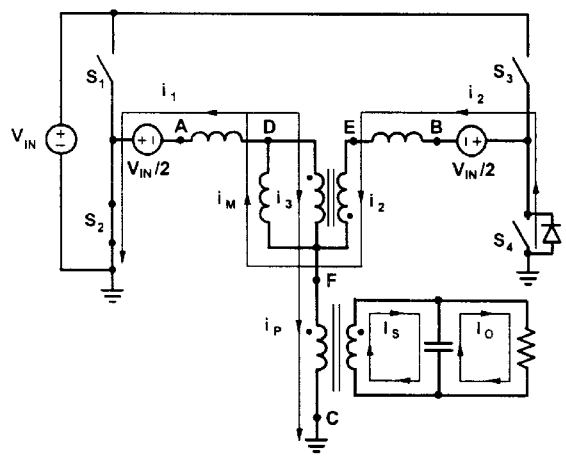
Figure 5H:
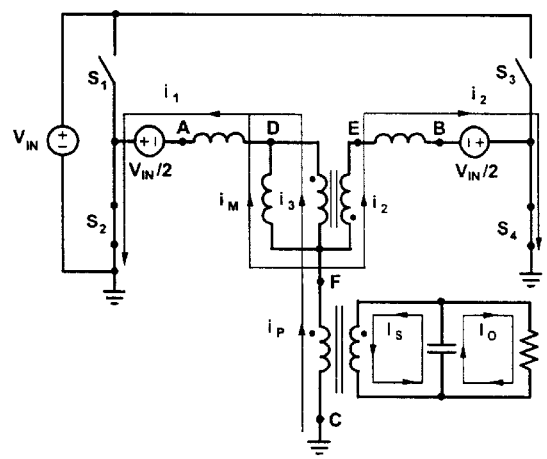
Figure 5I:
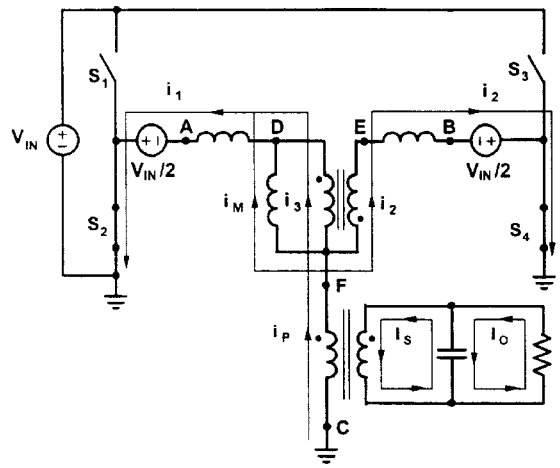

After $t=T_3$ when magnetizing current $i_M$ becomes zero, it continues to increase in the negative direction, as shown in FIG. 5(d). As a result, current $i_1$ continues to decrease, whereas current $i_2$ continue to increase, as seen from waveforms in FIGS. 6(m) and (n). At $t=T_4$ switch $S_3$ is turned off so that current $i_2$ is diverted from the transistor of switch $S_3$ to its output capacitance $C_3$, as shown in FIG. 5(e). Because during this transition $C_3$ is charging, while $C_4$ is discharging at the same rate, voltage $v_{S3}$ increases from zero toward $V_{IN}$, whereas voltage $v_{S4}$ decreases from $V_{IN}$ to zero, as illustrated in FIGS. 6(g) and (h). Also, since during this topological stage potential of point B decreases from $V_{IN}/2$ toward $-V_{IN}/2$ while potential of point A is constant at $-V_{IN}/2$, voltage $V_{AB}$ increases from $-V_{IN}$ toward zero. To achieve ZVS of switch $S_4$, the switch needs to be turned on while its antiparallel diode is conducting, i.e., during the $T_5$–$T_6$ interval. In FIG. 6, $S_4$ is turned on immediately after $t=T_5$, i.e., immediately after $v_{S4}$ falls to zero to minimize the conduction loss since the switch conduction loss is lower than the conduction loss of its antiparallel diode. At $t=T_6$, resonant primary current $i_P$ changes direction from positive to negative and the inverter enters the topological stage shown in FIG. 5(g). Because of resonant capacitor $C_R$ connected in parallel with the load, the output voltage lags the primary current, i.e., it is still positive at $t=T_6$. During the stage in FIG. 5(g), currents $i_1$ and $i_2$ continue to decrease. After current $i_2$ reaches zero at $t=T_7$, it continues to increase in the negative direction, as shown in FIG. 6(n). This topological stage, shown in FIG. 5(h), ends at $t=T_8$ when sinusoidal output voltage $v_o$ crosses zero. During the next topological stage, shown in FIG. 5(i), the output voltage continues to resonate in the negative direction.

Figure 5K:
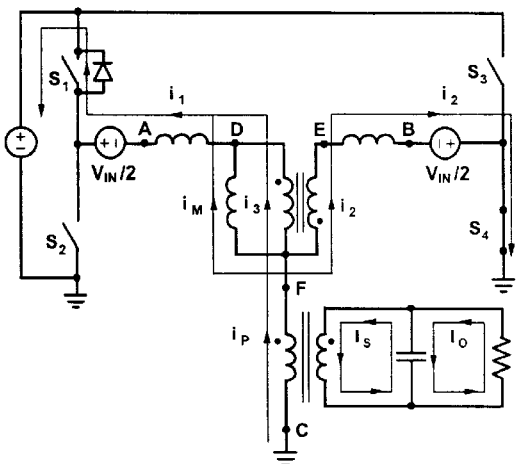
Figure 5J:
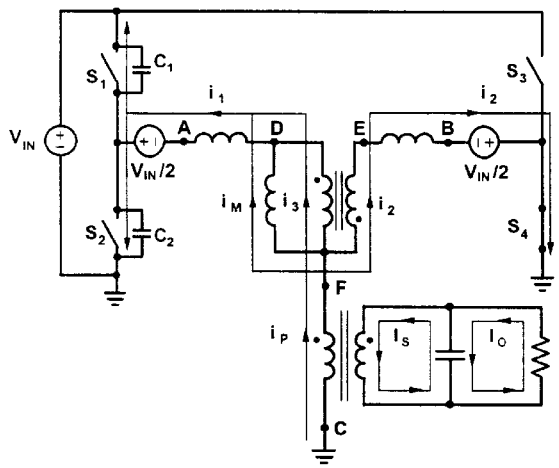
Figure 5L:
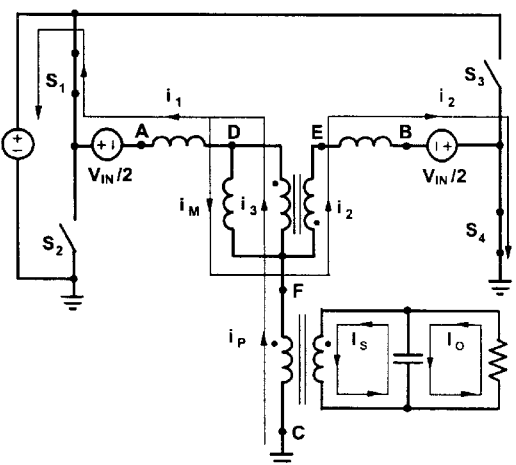

The second half of a switching cycle starts at $t=T_9$ when $S_2$ is turned off. If the switching frequency of the inverter is higher than the resonant frequency of the resonant-tank circuits, switch $S_2$ is turned off when currents $i_1$, $i_2$, and $i_P$ are negative. As a result, after $S_2$ is turned off negative current $i_1$ charges capacitance $C_2$ of switch $S_2$ and discharges capacitance $C_1$ of switch $S_1$, as shown in FIG. 5(j). During this switching transition voltage $V_{AB}$ increases from zero toward $V_{IN}$, while primary voltage $V_{AC}$ increases from $-V_{IN}/2$ to $V_{IN}/2$. This topological stage ends at $t=T_{10}$ when voltage $v_{S1}$ across switch $S_1$ reaches zero and antiparallel diode $D_1$ of switch $S_1$ starts conducting current $i_1$, as shown in FIG. 5(k). To achieve ZVS of switch $S_1$, switch $S_1$ needs to be turned on while $D_1$ is conducting. In FIG. 6, switch $S_1$ is turned on immediately after $v_{S1}$ has fallen to zero. Because after switch $S_2$ is turned off voltage $V_{AB}$ starts increasing, magnetizing current $i_M$ starts increasing as well, as can be seen from FIG. 6(l). At $t=T_{11}$, $i_M$ becomes positive, as shown in both FIG. 5(l) and FIG. 6(l). Finally, at $t=T_{12}$ switch $S_4$ is turned off, which initiates switching transition in the $S_3$–$S_4$ leg. Because during this transition $C_3$ is discharging and $C_4$ is charging, potential of point B is increasing from $-V_{IN}/2$ to $V_{IN}/2$. Since during this time potential of point A is constant at $V_{IN}/2$, voltage $v_{AB}$ is decreasing from $V_{IN}$ toward zero. At $t=T_{13}$ capacitance of switch $S_3$ is fully discharged and current $i_2$ starts flowing through antiparallel diode $D_3$ of switch $S_3$, as shown in FIG. 5(n). To achieve ZVS switch $S_3$ is turned shortly after $D_3$ starts conducting. During the topological stage in FIG. 5(n), primary current $i_P$, current $i_1$, and current $i_2$ continue to increase from negative values toward positive values, as seen from waveforms in FIGS. 6(k), (m), and (n). Current $i_1$ becomes positive at $t=T_{14}$, whereas current $i_2$ becomes positive at $t=T_{15}$, which completes a cycle of operation of the circuit. The next switching cycle is initiated by the control at $t=T_{17}$.

As can be seen from the waveforms in FIG. 6, the commutation of the switches in the $S_1$–$S_2$ leg is initiated when current $i_1=i_2+i_M=(i_P+i_M)/2$ is maximal, i.e. when $i_1=(i_P+I_M^+)/2$. Also, the commutation of the switches in the $S_3$–$S_4$ leg is initiated when current $i_2=(i_{P-iM})/2$ is maximum, i.e., when $i_2=(i_P-I_M^-)/2=(i_P+I_M^+)/2$. Therefore, in the circuit of this invention, all primary switches are commutated with approximately the same magnitude current, which is a unique characteristic of the circuit. Specifically, the charging and discharging of the capacitances of switches in the $S_1$–$S_2$ leg is done by the sum of the energy stored in the resonant inductor $L_{R1}$ and the energy stored in the magnetizing inductance of coupled inductor $L_C$, whereas the charging and discharging of the capacitances of switches in the $S_3$–$S_4$ leg is done by the sum of the energy stored in $L_{R2}$ and $L_M$. To achieve ZVS of the bridge switches, the sum of the energy stored in the magnetizing inductance of the coupled inductor and the energy stored in the resonant inductor of the corresponding bridge leg must be high enough to fully discharge the capacitance of the switch that is about to be turned on. Generally, this ZVS condition can be expressed as $$\tfrac{1}{2}[\tfrac{1}{2}L_R i_P^2 + \tfrac{1}{2}L_M I_M^2] \geq CV_{IN}^2, \qquad (6)$$

where $C=C_1=C_2=C_3=C_4$ is the total capacitance across a primary switch, which beside output capacitance $C_{OSS}$ of the switch also includes any externally added capacitance.

Since from FIG. 4, primary current $i_P$ is $$i_P = \frac{1}{n} \cdot v_O \left( \frac{1}{R_L} + \frac{1}{j \cdot 2 \cdot \pi \cdot f_S \cdot C_R} \right), \qquad (7)$$

it can be seen that energy stored in resonant inductors $L_{R1}$ and $L_{R2}$ is dependent on the load, as well as resonant capacitor $C_R$. At no load ($R_L = \infty$), the primary current is the reflected current flowing through resonant capacitor $C_R$. This current represents the circulating current of the converter that is used to provide required energy to the resonant inductors to achieve ZVS. In the circuit of the present invention this circulating current can be minimized because the entire ZVS energy can be provided by the energy stored in the magnetizing inductance of the transformer. If the energy stored in the magnetizing inductance is selected so that at the maximum input voltage $V_{IN(max)}$ $$L_M I_M^2 \geq 4CV_{IN(max)}^2, \qquad (8)$$

ZVS is achieved in the entire load and input-voltage range regardless of the value of $C_R$.

The value of $L_M$ required to achieve ZVS at no load can be calculated from FIG. 6 by observing that during time interval $T_{10}$–$T_{12}$ magnetizing current $i_M$ changes linearly from maximum negative value $I^{31}_M = -I_M$ to maximum positive value $I^+_M = I_M$ i.e., $I_M$ changes for $2I_M$, due to a positive voltage of $V_{IN}/2$ impressed across the series connection of $L_{R1}$ and $L_C$. From the equivalent circuit in FIG. 5(k), it can be derived that the rate of change of magnetizing current $i_M$ during the $T_{10}$–$T_{12}$ time interval is $$\frac{di_M}{dt} = \frac{V_{IN}}{2L_M + L_R}, \quad (9)$$

where $L_R = L_{R1} = L_{R2}$.

Since according to FIG. 6 the time interval $T_{10}$–$T_{12}$, is approximately equal to $(1-D)T_S/2$, where D is duty cycle and $T_S$ is a switching period, $I_M$ can be calculated from $$V_{IN} = (2L_M + L_R) \cdot \frac{2I_M}{(1-D)\frac{T_S}{2}}, \quad (10)$$

$$I_M = \frac{(1-D)V_{IN}}{4 \cdot (2L_M + L_R) \cdot f_S}, \quad (11)$$

where $f_S = 1/T_S$ is the switching frequency. Since at no load $D \approx 0$ because the two bridge legs must be out of phase, the ZVS condition at no load and high line from Eqs. (8) and (11) is $$L_M \cdot \left(\frac{V_{IN(max)}}{4 \cdot (2L_M + L_R) \cdot f_S}\right)^2 \geq 4CV_{IN(max)}^2. \quad (12)$$

Finally, from Eq. (12), the approximate value of $L_M$ required to maintain ZVS at no load and high line is $$L_M \leq \frac{1}{256Cf_S^2}, \quad (13)$$

assuming that $2L_M \gg L_R$.

As can be seen from FIG. 4, current $i_M$ flowing through magnetizing inductance $L_M$ introduces a current asymmetry in the two bridge legs. Namely, because of the coupling of windings DF and FE, current $i_2$ flowing trough winding FE is equal to current $i_3$ flowing through winding DF so that $i_1 = i_2 + i_M$. Therefore, in the circuit of this invention, leading leg $S_1$–$S_2$ always carries a higher current than the lagging leg $S_3$–$S_4$, the difference being magnetizing current $i_M$.

Since in the circuit in FIG. 3 primary current $i_P = i_1 + i_2$ is divided between the two bridge legs, i.e. it is effectively carried by two parallel current paths, the minimum total conduction loss of the primary switches is obtained if equal currents flow through the both legs of the bridge. With the equal current distribution between the bridge legs, the total conduction loss of the bridge can be reduced in half because the two conducting switches of the bridge carry only one half of primary current $i_P$. Therefore to simultaneously achieve ZVS at no load and minimize the bridge conduction loss in the circuit in FIG. 3, it is necessary to select the maximum magnetizing inductance $L_M$ determined by Eq. (11) so that the imbalance of the leg currents is minimized. Furthermore, if this minimized current imbalance is still significant, i.e., if current $i_2$ in lagging lag $S_3$–$S_4$ is significantly lower than current $i_1$ in the leading leg $S_1$–$S_2$, different size switches can be selected for the two legs, which may reduce the cost of the implementation without sacrificing the circuit performance.

Figure 7:
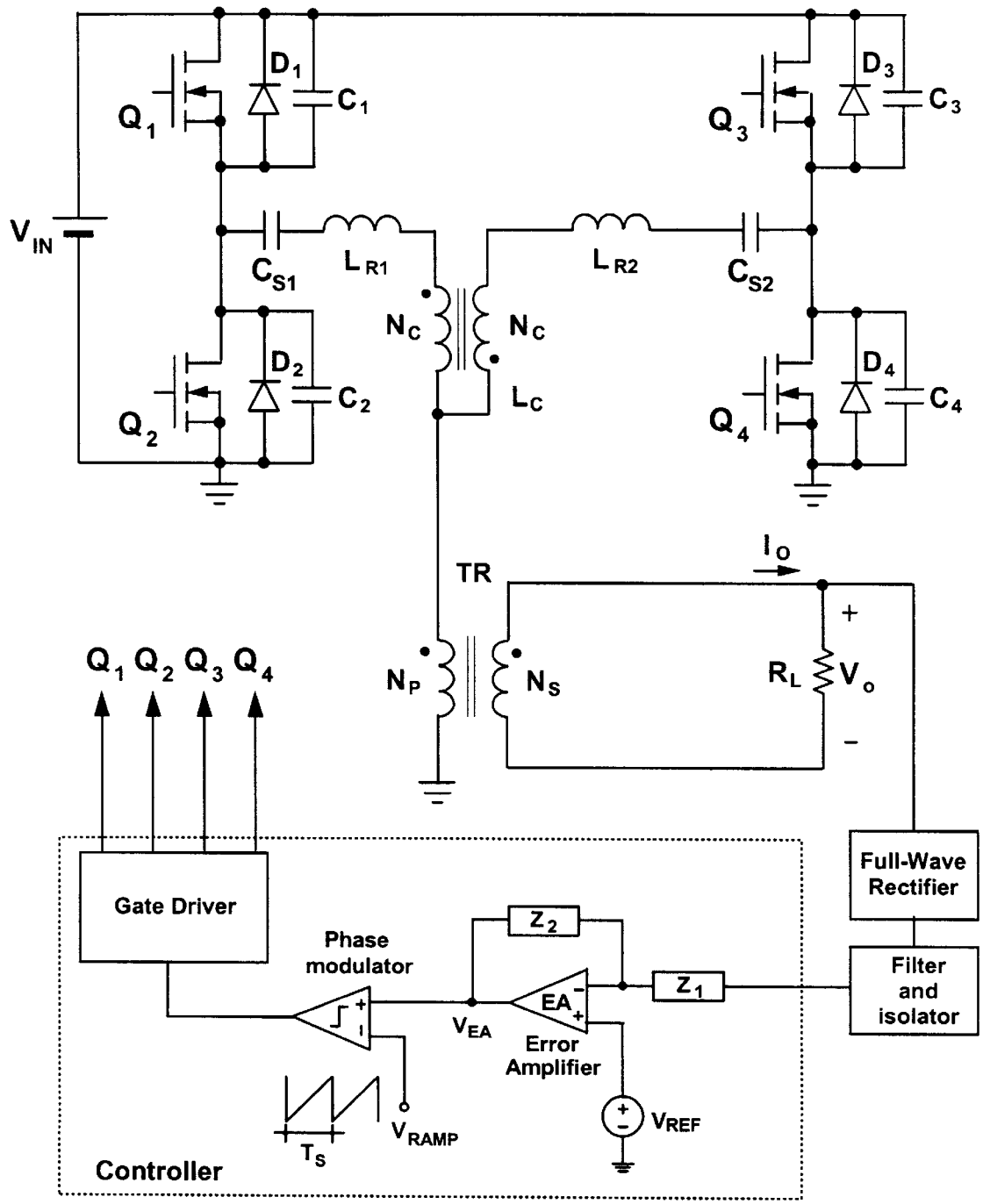
FIG. 7 shows embodiment of present invention in SRI.
Figure 8:
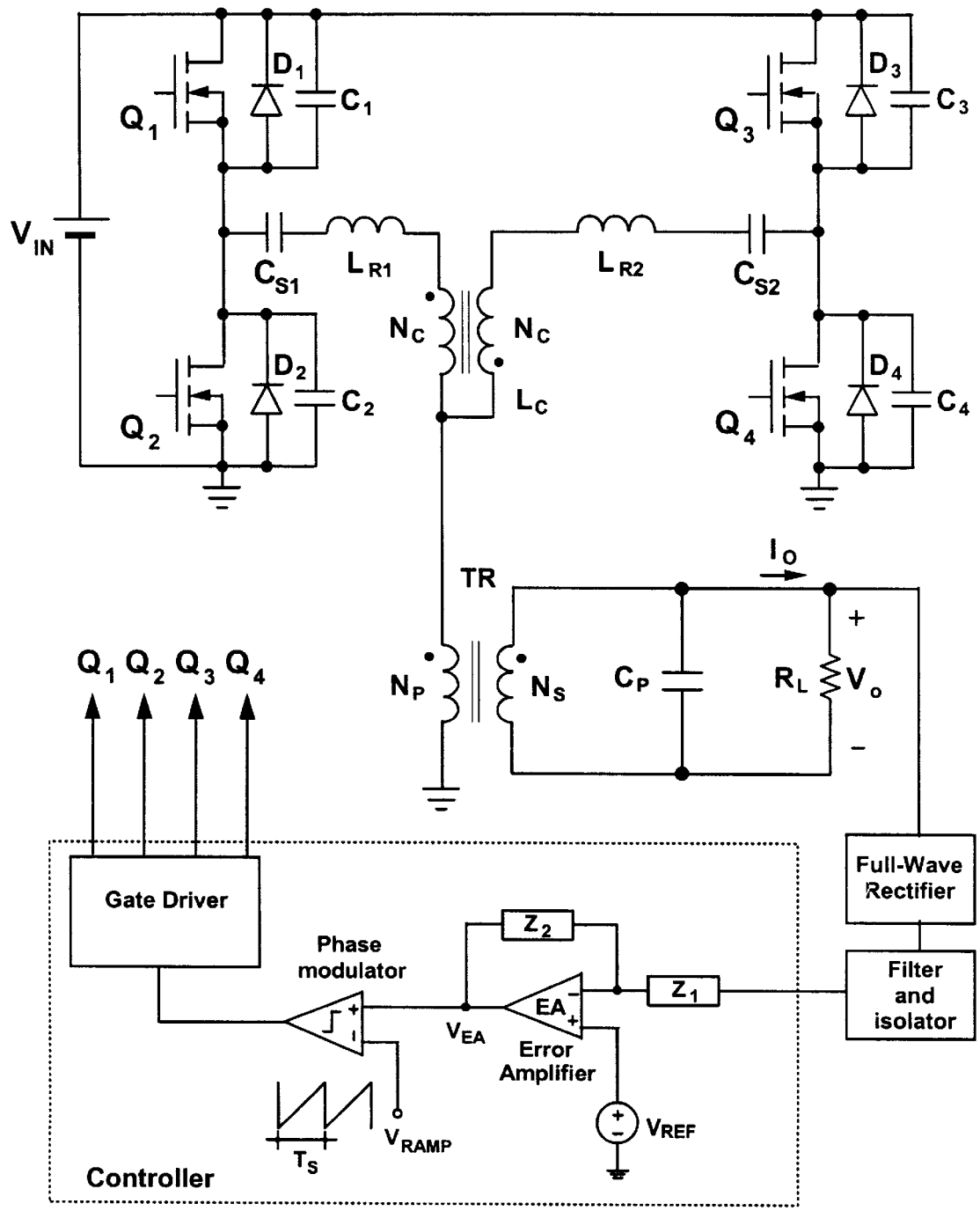
FIG. 8 shows embodiment of present invention in SPRI.
Figure 9A:
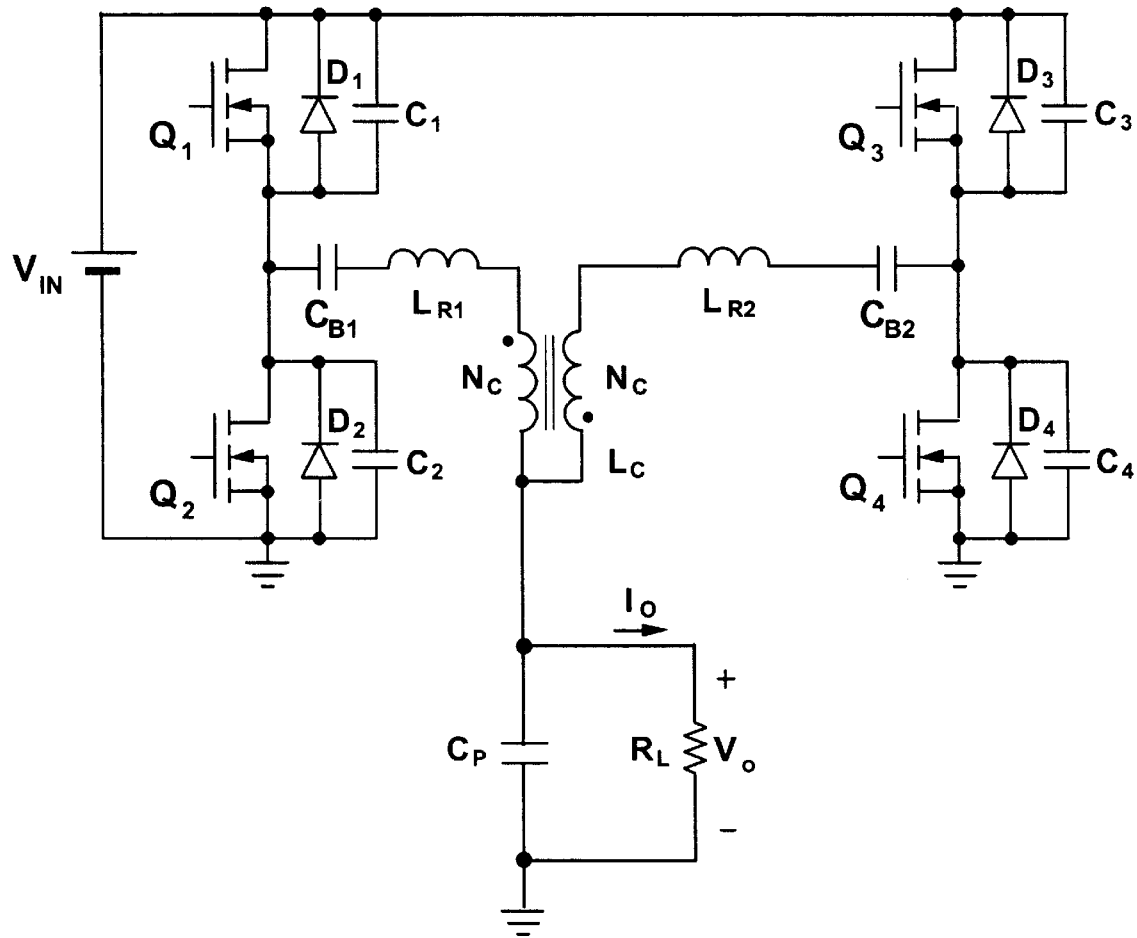
FIG. 9 shows embodiment of present invention in non-isolated inverters: (a) PRI implementation; (b) SRI implementation; (c) SPRI implementation.
Figure 9B:
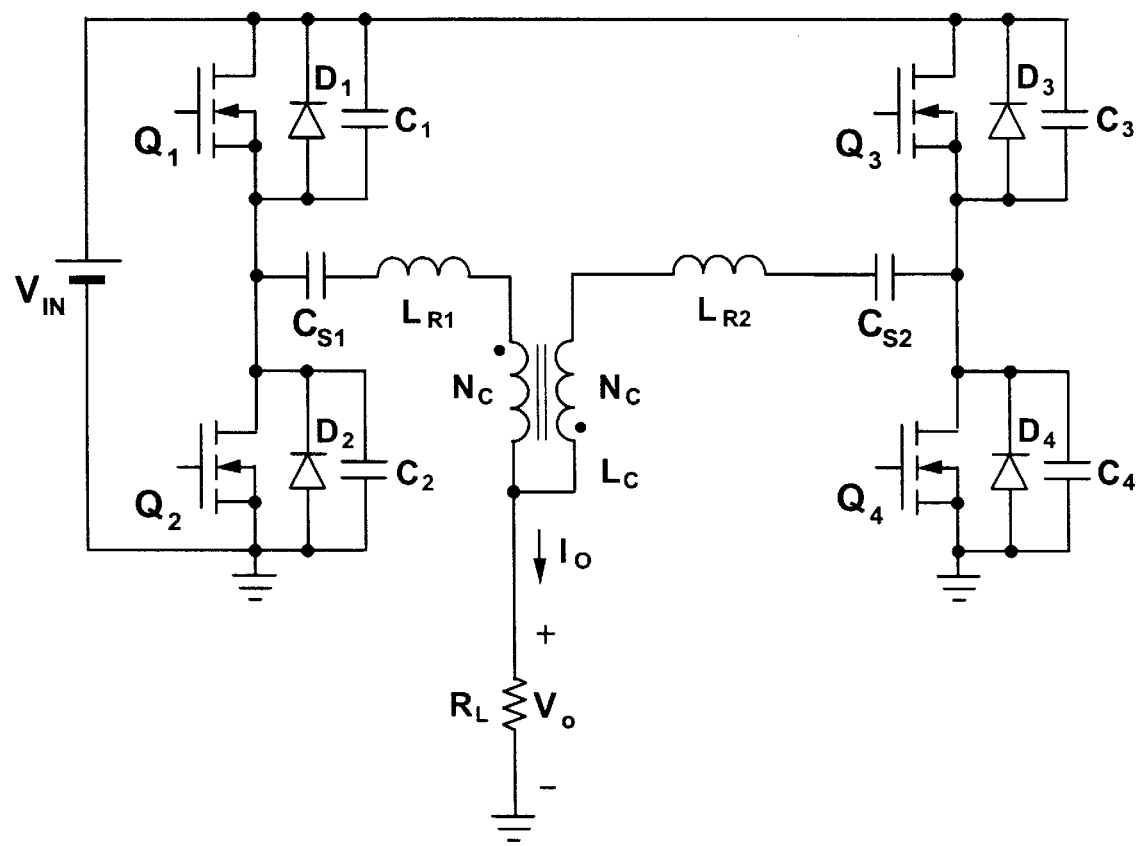
Figure 9C:
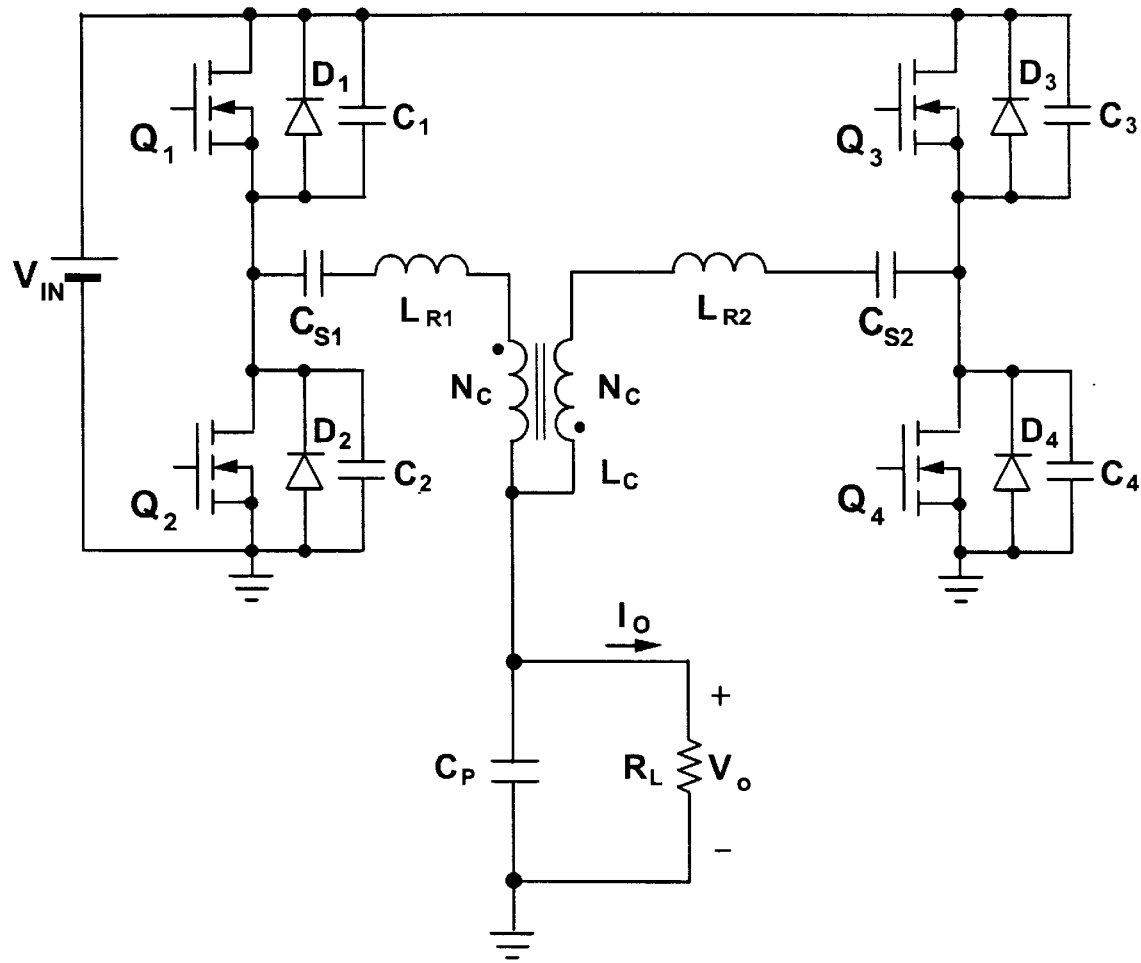

The embodiments of the present invention in the isolated SRI and SPRI are shown in FIGS. 7 and 8, respectively. The present invention can also be applied to the non-isolated inverter topologies, as shown in FIG. 9.

Figure 10:
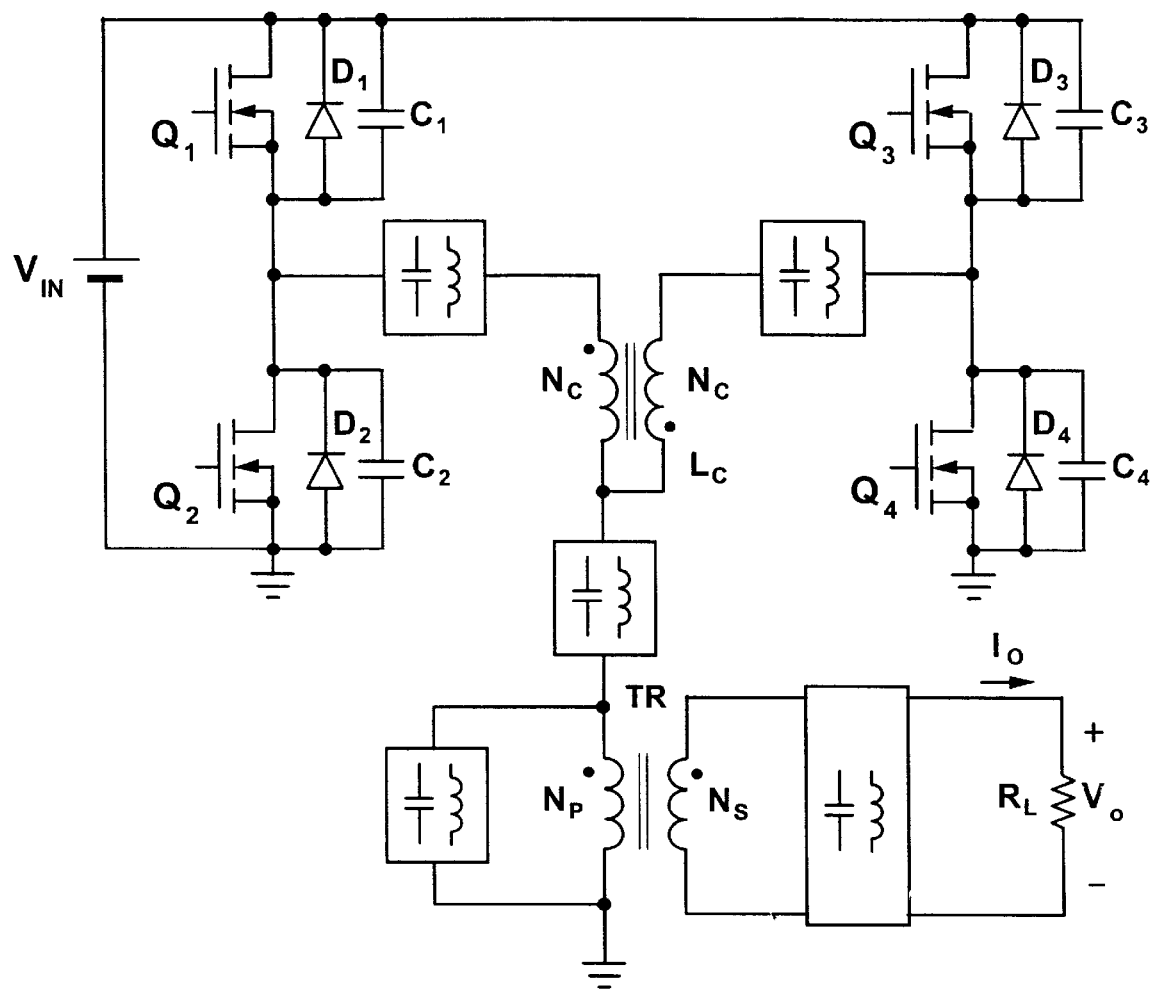
FIG. 10 shows generalized inverter in accordance with present invention.

Finally, it should be noted that the present invention can also be applied to any other phase-shift-controlled resonant circuit. FIG. 10 shows the generalized circuit diagram of the present invention. The only requirement for the circuit to properly operate according to the present invention is to provide either a resonant or a blocking capacitor in the series path of at least two terminals of the coupled inductor.

The phase-shift control of the circuits in the present invention can be implemented with any of the commercially available phase-shift IC controller. Generally, the output voltage of the inverter is related to the phase-shift angle of the to bridge legs as $(0° < \theta < 180°)$ $$v_o = \frac{2\sqrt{2}}{\pi}\left(\frac{V_{IN}}{n}\right)\frac{\cos\left(\frac{\theta}{2}\right)}{\sqrt{1 + (Q-2)\left(\frac{\omega}{\omega_0}\right)^2 + \left(\frac{\omega}{\omega_0}\right)^4}}, \quad (14)$$

where $$Q = \frac{1}{R_L}\sqrt{\frac{L_R}{2C}}, \ \omega = 2\pi f_S, \text{ and } \omega_0 = \sqrt{\frac{2}{L_R C}}. \quad (15)$$

REFERENCES

1. M. K. Kazimierczuk and D. Czarkowski, *Resonant Power Converters*, John Wiley & Sons, Inc., New York, 1995 (Ch. 12, pp. 331–345).
2. J. Sabaté et al., "Analysis and Design Optimization of LCC Resonant Inverter for High-Frequency AC Distributed Power System,", *IEEE Trans. Industrial Electronics*, vol. 42, no. 1, pp. 63–71, February 1995.
3. D. Czarkowski and M. K. Kazimierczuk "Phase-Controlled Series-Parallel Resonant Converter," *IEEE Trans. Power Electronics*, vol. 8, no. 3, pp. 309–319, July 1993.

What is claimed is:

1. A full bridge, resonant, constant-frequency, phase-shift-controlled, dc to ac inverter comprising in combination:

a coupled inductor having first and second winding, said first winding and said second winding connected in series forming a common terminal of said coupled inductor;

two pairs of series connected controllable switching devices connected across a dc power source, each of said controllable switching devices including antiparallel diode, and each of said controllable switching devices further including a capacitance in parallel therewith;

a first junction between a first pair of said controllable switching devices;

a second junction between a second pair of said controllable devices;

a transformer with primary and secondary windings;

a pair of resonant inductors, each of said resonant inductors connected in series with a series capacitor, a first of said pair of resonant inductors and its series capacitor connected between said first junction and a non-common terminal of said first winding of said coupled inductor; a second of said pair of resonant inductors and its series capacitor connected between said second junction and a non-common terminal of said second winding of said coupled inductor;

said primary winding of said transformer connected between the common terminal of said first and second windings of said coupled inductor and a terminal of said dc power source;

said secondary winding of said transformer connected across a load;

control means which periodically opens and closes said controllable switching devices to maintain a regulated ac voltage across said load; said control means providing a dead time in each of said pairs of said controllable switching devices between the opening of one said controllable switching device and the closing of the other said controllable switching device, said switching means further providing a delay time between the moment a switch in one of said pairs of said controllable switching devices and a switch in the other said pair of said controllable switches is closed.

2. An inverter as in claim 1, further comprising a parallel resonant capacitor connected across said secondary winding of said transformer.

3. An inverter as in claim 1, further comprising a parallel resonant capacitor connected across said primary winding of said transformer.

4. An inverter as in claim 1 wherein the turns ratio of said first and second winding of said coupled inductor is unity.

5. An inverter as in claim 2 wherein the turns ratio of said first and second winding of said coupled inductor is unity.

6. An inverter as in claim 3 wherein the turns ratio of said first and second winding of said coupled inductor is unity.

7. An improved, resonant, constant-frequency phase-shift-controlled dc to ac inverter as in claim 1 wherein the energy stored in said resonant inductors and the magnetizing inductance of said coupled inductor is sufficient to discharge said capacitances across said controllable switching devices prior to the instant said controllable switching devices are closed so that there is substantially zero voltage across said controllable switching devices when they switch from a non-conducting to a conducting state.

8. A full bridge, resonant, constant-frequency, phase-shift-controlled, dc to ac inverter comprising in combination:
   a coupled inductor having first and second winding, said first winding and said second winding connected in series forming a common terminal of said coupled inductor;
   two pairs of series connected controllable switching devices connected across a dc power source, each of said controllable switching devices including antiparallel diode, and each of said controllable switching devices further including a capacitance in parallel therewith;
   a first junction between a first pair of said controllable switching devices;
   a second junction between a second pair of said controllable devices;
   a transformer with primary and secondary windings;
   a pair of series resonant circuits, each of said resonant circuits consisting of a series connection of a resonant capacitor and resonant inductor, a first of said pair of series resonant circuits connected between said first junction and a non-common terminal of said first winding of said coupled inductor; a second of said pair of series resonant circuits connected between said second junction and a non-common terminal of said second winding of said coupled inductor;
   said primary winding of said transformer connected between the common terminal of said first and second windings of said coupled inductor and a terminal of said dc power source;
   said secondary winding of said transformer connected across a load;
   control means which periodically opens and closes said controllable switching devices to maintain regulated ac voltage across said load; said control means providing a dead time in each of said pairs of said controllable switching devices between the opening of one said controllable switching device and the closing of the other said controllable switching device, said switching means further providing a delay time between the moment a switch in one of said pairs of said controllable switching devices and a switch in the other said pair of said controllable switches is closed.

9. An inverter as in claim 8, further comprising a parallel resonant capacitor connected across said secondary winding of said transformer.

10. An inverter as in claim 8, further comprising a parallel resonant capacitor connected across said primary winding of said transformer.

11. An inverter as in claim 8 wherein the turns ratio of said first and second winding of said coupled inductor is unity.

12. An inverter as in claim 11 wherein the turns ratio of said first and second winding of said coupled inductor is unity.

13. An inverter as in claim 12 wherein the turns ratio of said first and second winding of said coupled inductor is unity.

14. An improved, resonant, constant-frequency phase-shift-controlled dc to ac inverter as in claim 8 wherein the energy stored in said resonant inductors and the magnetizing inductance of said coupled inductor is sufficient to discharge said capacitances across said controllable switching devices prior to the instant said controllable switching devices are closed so that there is substantially zero voltage across said controllable switching devices when they switch from a non-conducting to a conducting state.

15. A full bridge, resonant, constant-frequency, phase-shift-controlled, dc to ac inverter comprising in combination:
   a coupled inductor having first and second winding, said first winding and said second winding connected in series forming a common terminal of said coupled inductor;
   two pairs of series connected controllable switching devices connected across a dc power source, each of said controllable switching devices including antiparallel diode, and each of said controllable switching devices further including a capacitance in parallel therewith;
   a first junction between a first pair of said controllable switching devices;
   a second junction between a second pair of said controllable devices;
   a pair of resonant inductors, each of said resonant inductors connected in series with a series capacitor, a first of said pair of resonant inductors and its series capacitor connected between said first junction and a non-common terminal of said first winding of said coupled inductor; a second of said pair of resonant inductors and its series capacitor connected between said second junction and a non-common terminal of said second winding of said coupled inductor;
   a load, said load connected across said parallel resonant capacitor;
   control means which periodically opens and closes said controllable switching devices to maintain a regulated ac voltage across said load; said control means providing a dead time in each of said pairs of said controllable switching devices between the opening of one said controllable switching device and the closing of the other said controllable switching device, said switching means further providing a delay time between the moment a switch in one of said pairs of said controllable switching devices and a switch in the other said pair of said controllable switches is closed.

16. An inverter as in claim 15, further comprising a parallel resonant capacitor connected across said load.

17. An inverter as in claim 15 wherein the turns ratio of said first and second winding of said coupled inductor is unity.

18. A full bridge, resonant, constant-frequency phase-shift-controlled dc to ac inverter as in claim 15 wherein the energy stored in said resonant inductors and the magnetizing inductance of said coupled inductor is sufficient to discharge said capacitances across said controllable switching devices prior to the instant said controllable switching devices are closed so that there is substantially zero voltage across said controllable switching devices when they switch from a non-conducting to a conducting state.

19. A full bridge, resonant, constant-frequency, phase-shift-controlled, dc to ac inverter comprising in combination:

a coupled inductor having first and second winding, said first winding and said second winding connected in series forming a common terminal of said coupled inductor;

two pairs of series connected controllable switching devices connected across a dc power source, each of said controllable switching devices including antiparallel diode, and each of said controllable switching devices further including a capacitance in parallel therewith;

a first junction between a first pair of said controllable switching devices;

a second junction between a second pair of said controllable devices;

a pair of series resonant circuits, each of said resonant circuits consisting of a series connection of a resonant capacitor and resonant inductor, a first of said pair of series resonant circuits connected between said first junction and a non-common terminal of said first winding of said coupled inductor; a second of said pair of series resonant circuits connected between said second junction and a non-common terminal of said second winding of said coupled inductor;

a load, said load connected across said parallel capacitor;

control means which periodically opens and closes said controllable switching devices to maintain regulated ac voltage across said load; said control means providing a dead time in each of said pairs of said controllable switching devices between the opening of one said controllable switching device and the closing of the other said controllable switching device, said switching means further providing a delay time between the moment a switch in one of said pairs of said controllable switching devices and a switch in the other said pair of said controllable switches is closed.

20. An inverter as in claim 19, further comprising a parallel resonant capacitor connected across said load.

21. An inverter as in claim 19 wherein the turns ratio of said first and second winding of said coupled inductor is unity.

22. A full bridge, resonant, constant-frequency phase-shift-controlled dc to ac inverter as in claim 19 wherein the energy stored in said resonant inductors and the magnetizing inductance of said coupled inductor is sufficient to discharge said capacitances across said controllable switching devices prior to the instant said controllable switching devices are closed so that there is substantially zero voltage across said controllable switching devices when they switch from a non-conducting to a conducting state.

23. An inverter as in claim 1 wherein each of said controllable switching devices is comprised of a mosfet.

24. An inverter as in claim 8 wherein each of said controllable switching devices is comprised of a mosfet.

25. An inverter as in claim 15 wherein each of said controllable switching devices is comprised of a mosfet.

26. An inverter as in claim 19 wherein each of said controllable switching devices is comprised of a mosfet.

* * * * *